April 28, 1953     J. N. MATTHEWS     2,636,766
MECHANISM FOR CLAMPING TARPAULINS AND THE LIKE
Filed March 2, 1950     2 SHEETS—SHEET 2
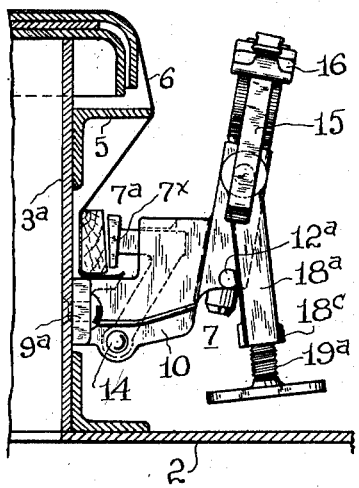
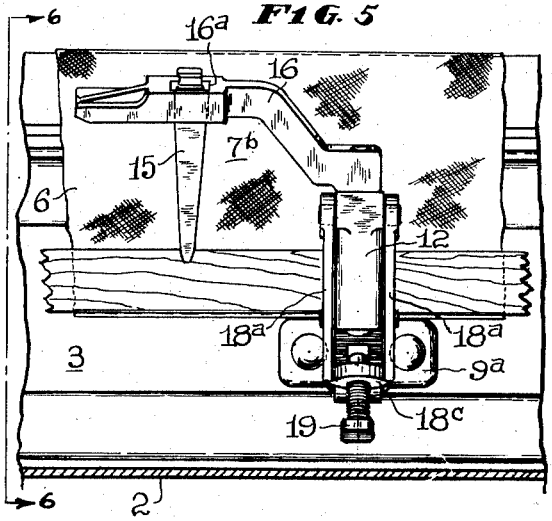
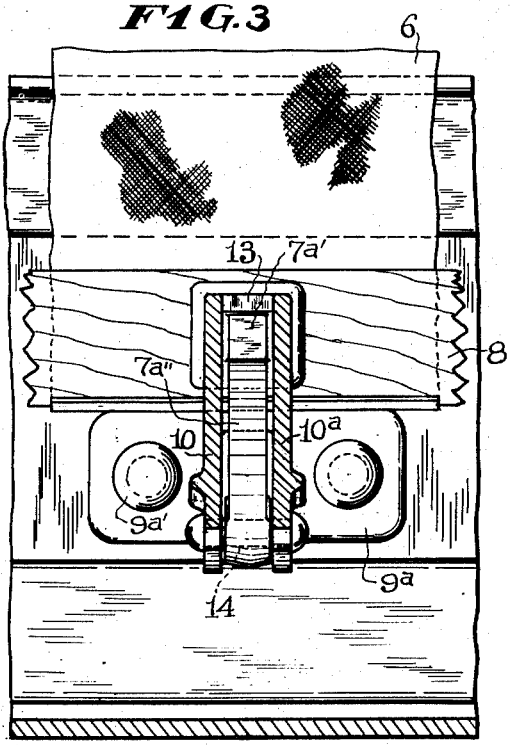
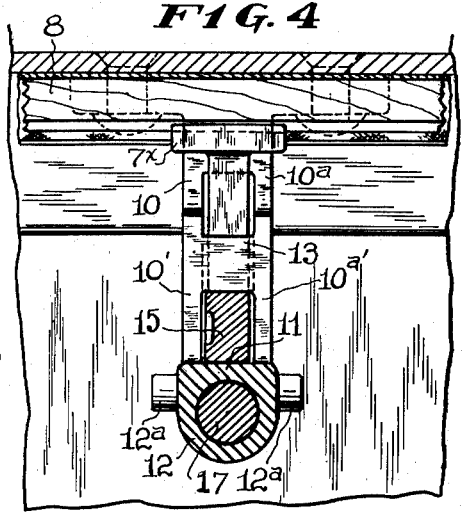
INVENTOR.
JOSEPH N. MATTHEWS.
BY
Geo. B. Pitts
ATTORNEY Patented Apr. 28, 1953

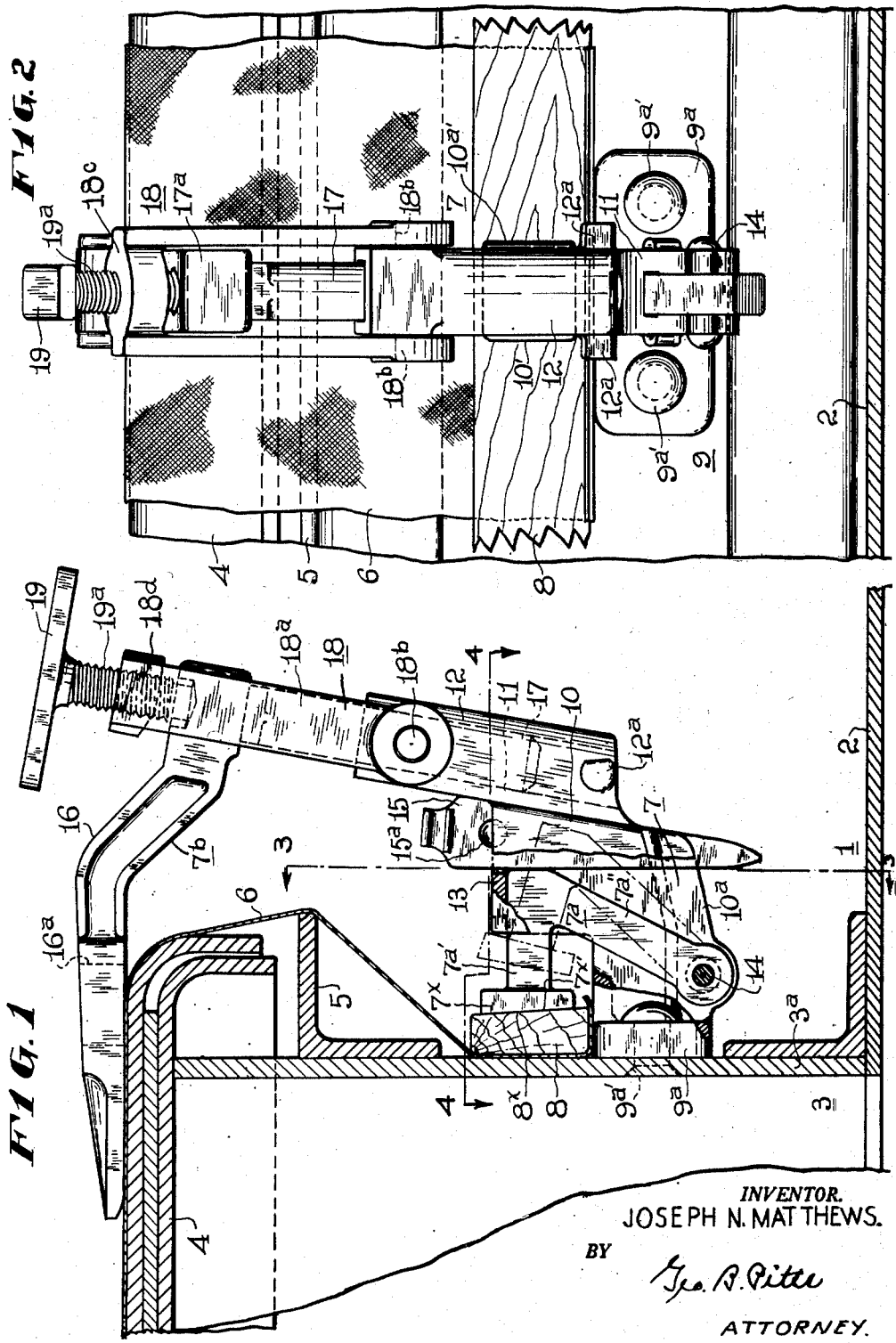

2,636,766

UNITED STATES PATENT OFFICE 2,636,766

MECHANISM FOR CLAMPING TARPAULINS AND THE LIKE

Joseph N. Matthews, Lakewood, Ohio

Application March 2, 1950, Serial No. 147,320

5 Claims. (Cl. 292—256.5)

This invention relates to devices for clamping tarpaulins when positioned over and around hatches and the covers therefor. The devices embodying my invention are particularly applicable for hatches on boats, for example ore boats and the like, where each hatch occupies a large area to accommodate material handling apparatus and accordingly the tarpaulin, on account of the size thereof required to cover and enclose the hatch, is readily loosened by winds unless securely clamped in position.

Tarpaulins, when used in the manner above referred to, are subjected to abnormal weather conditions, particularly high winds or gales, so that severe forces, which are variable in movement and intensity and in some instances more or less continuous for long periods, are applied to the tarpaulins and their clamping mechanisms as long as these conditions prevail. Under these circumstances, if any looseness of the tarpaulin develops by reason of the inefficiency of the clamping mechanism therefor, the tarpaulin may become dislocated, with resulting damage to the cargo, unless the looseness is taken up and the clamping mechanism is propmtly reclamped.

Furthermore, it is desirable to so clamp the tarpaulin in position that when severe weather conditions prevail, members of the crew are not required to be subjected to these atmospheric conditions, which in boats of the type referred to, involve dangerous risks. Also, all clamping devices adapted for use in battening ship hatches, of which I have knowledge, employed certain separable parts, so that when the devices were not in use no provision was made to prevent misplacement of these parts or danger of injury to the ship's crew and other persons, traversing or working on the boat deck, but were left on the latter near the hatch supposedly for ready re-use. However, incident to cleaning the boat deck, moving equipment thereon and engineering the cargo handling apparatus into and out of the hatches, these parts were often shifted around on the deck, to create a hazard to the crew or to get lost.

One object of the invention is to provide an improved clamping mechanism wherein during non-use thereof, all of its parts are maintained together preferably in an inoperative relationship, to avoid misplacement or loss.

Another object of the invention is to provide an improved clamping mechanism wherein the operation of battening a hatch under a rigid clamping pressure may be readily effected, whereby the crew is relieved from danger of risks.

Another object of the invention is to provide an improved clamping mechanism for securing a tarpaulin over a hatch wherein the batten and clamping member that engages therewith are interrelated to increase the gripping or securing action between them when the wind or other force exerts a pull on the tarpaulin.

Another object of the invention is to provide for battening the marginal edge of a tarpaulin in relation to the side wall of a hatch, wherein the clamping element, which engages the batten and is operated into clamped position by a wedge, is movably supported in position to engage the batten by a downward extending leg pivotally mounted on the walls of the supporting member, whereby misplacement of the clamping element is avoided and bodily handling of the clamping element is eliminated.

A further object of the invention is to simplify the constructions shown in Letters Patent heretofore granted to me No. 2,176,915, dated October 24, 1939, and No. 2,261,557, dated November 4, 1941.

Other objects of the invention will be apparent to those skilled in the art to which my invention relates from the following description taken in connection with the accompanying drawings, wherein:

Fig. 1 is a fragmentary view showing in section a portion of a boat hatch and a tarpaulin and a clamping mechanism, parts of which are broken away, embodying my invention, in clamping position;

Fig. 2 is a view of the parts shown in Fig. 1 looking toward the left;

Figs. 3 and 4 are sections on the lines 3—3 and 4—4, respectively, of Fig. 1;

Fig. 5 is a view showing the position of the parts when the clamping element has been released to permit removal of the batten and tarpaulin; and Fig. 6 is a view of the parts shown in Fig. 5 on the line 6—6, thereof.

In the drawings a portion of a boat 1 having a deck 2 and a portion of a hatch 3 are shown. In the aforesaid Patent No. 2,176,915, the hatch is elongated and extends transversely of the deck 2, but the hatch may be of a different shape and of any desired size dependent on the construction and size of the boat. 4 indicates the cover members for the hatch 3.

6 indicates the tarpaulin which is stretched over the hatch covers 4 and angles 5, as shown in the upper portion of Fig. 1, with its marginal side and end portions clamped to or against the side walls 3a of the hatch by a plurality of clamping mechanisms, the mechanisms being spaced along the side walls of the sides and ends of each hatch, their clamping elements being arranged to engage and clamp a bar or batten 8, which is preferably formed of wood and extends substantially from end to end of each side wall and end wall. As will be understood from Figs. 1, 2 and 3, the adjacent marginal edge of the tarpaulin 6 is clamped between the bar 8 and side wall 3a, such edge being doubled on itself, when its size makes this doubling over necessary.

The above arrangement of the clamping mechanisms to secure a tarpaulin in position will be apparent from the aforesaid Patent No. 2,176,915, for which reason only one clamping mechanism, indicated as an entirety at 7, is shown herein. The mechanism includes a main clamping device, indicated as an entirety at 7a for engaging the bar or batten 8 and operates therethrough to secure the tarpaulin to the hatch side wall 3a and a supplemental clamping device, indicated as an entirety at 7b, operable as later set forth to engage that portion of the tarpaulin which extends over the hatch covers. These devices are constructed in a manner whereby either device may be operated independently of the other or conjointly operated, and/or the supplemental clamping device removed.

The mechanism 7 comprises the following: 9 indicates as an entirety a supporting member, having an elongated base 9a preferably secured to the side wall 3a by rivets 9a'. 10, 10a, indicate spaced, parallely related walls integrally connected to and extending outwardly from the base 9a, between the rivets 9a' and terminating in upwardly extending wall portion 10', 10a'; respectively, spaced from the hatch side wall 3a to provide ample room to position the batten 8 with the tarpaulin between it and the side wall 3a. As shown, the upper edges of the walls 10, 10a, provide a support for the batten 8, while the parts are being positioned to effect a clamping of the tarpaulin 6. The outer ends of the walls 10—10', 10a—10a' are integrally connected to an elongated wall 11, which extends upwardly above the walls 10', 10a' and forms the inner wall of an elongated tubular member 12. The outer ends of the walls 10—10', 10a—10a' extend at an upwardly and outwardly inclined angle to support the wall 11 in an inclined plane for a purpose later set forth. The upper ends of the walls 10', 10a', are connected intermediate their opposite ends by a plate 13 preferably formed integrally therewith.

The wall 13 is arranged adjacent the inner side edges of the walls 10', 10a'; preferably, the inner transverse end of the wall 13 is alined with the inner side edges of the walls 10', 10a'. In this arrangement an opening is provided between the wall 13 and wall 11 for a purpose later set forth.

The main clamping device 7a consists of an angularly shaped member disposed between the walls 10—10', 10a—10a', one arm 7a' of the device, when the latter is positioned to effect a clamping engagement with batten 8 (as later set forth), being disposed at right angles to the hatch side wall 3a and its other arm 7a" extending downwardly and inwardly and pivotally supported at its lower end by a transverse shaft 14, the axis of which is substantially in a vertical plane cutting the outer end of the arm 7a', when the latter is in clamping position. In this arrangement of the shaft 14, it is mounted in a vertical plane disposed between the base 9a and wall 13 (which as later set forth limits the inward swinging movement of the device 7a), so that when the device 7a is disengaged from a batten 8 and moved to its in-operative position, as shown in dotted lines in Fig. 1, the weight of the arms 7a', 7a" at their connected together ends tends to maintain the device in the latter position. The opposite ends of the shaft 14 are suitably supported in the walls 10, 10a. As shown in Fig. 3, the clamping device 7a has a width less than the space between the walls 10, 10a, so as to be free to swing about the shaft 14 therebetween. In this form of clamping device, and its mounting, when it swings outwardly—away from the batten 8—the upper wall of the arm 7a' recedes from the wall 13 so that danger of engagement therewith is eliminated. The outer end of the arm 7a' is preferably provided with a head 7x, so that the pressure imparted to the batten 8 will be applied over a large area thereof. It will be noted that the opposed faces of the clamping head 7x and batten 8 are provided with interlocking elements, which are shown as consisting of complementary reversely inclined surfaces 7x', 8x, respectively; that is, the surface 7x' between its side edges of the clamping head 7x is inclined upwardly and inwardly toward the hatch side wall 3a, whereas the surface 8x on the outer side of the batten is inclined downwardly and outwardly away from the hatch side wall 3a. In this arrangement, when the clamping device 7a is in clamped position, the head 7a' and batten 8 are locked together, so that any upward pull or tension on the tarpaulin, due to wind intensities or otherwise, will tend to increase the gripping or clamping pressure between the head 7x and batten 8, which pressure will be transmitted through the batten to increase the pressure thereon on the tarpaulin 6.

As shown in Figs. 1 and 4, the outer end of the plate 13 is spaced from the wall 11 to form an opening into and through which a wedge 15 is projected downwardly in loosely sliding engagement with the walls 10—10', 10a—10a'. In this movement of the wedge 15, its outer face, which is inclined at the same angle as the wall 11, slidably engages the latter, whereas its inner face, which is vertically disposed, slidably engages a flat vertical bearing surface on the outer end of the arm 7a'. It will thus be seen that when the wedge 15 is forced downwardly, by one or more blows with a hammer, a wedging action takes place between the wall 11 and clamping device 7a, which action is effective to impart pressure on and through the batten 8, whereby the latter secures the tarpaulin 6 to the side wall 3a. The inner end of the plate 13 is disposed in the path of movement of the upper side wall of the head 7x to form a stop for the clamping element 7a when the latter is swung away from the hatch side wall 3a, as shown in dotted lines in Fig. 1.

One side of the wedge 15 is formed with a recess 15a, so that by the use of a rod or similar device, one end of which is engaged with the upper wall of the recess, and a hammer to strike the other end of the rod, the wedge 15 may be loosened and removed; or where the free end of the wedge extends below the walls 10, 10a, such end may be tapped by a hammer.

The supplemental clamping device 7b comprises an arm 16 arranged to engage that portion of the tarpaulin extending over the adjacent portion of the hatch cover and a depending leg 17, which removably and endwise slidably fits into the tubular member 12. The inner wall of the member 12 and leg 17 are preferably round so that the device 7b may be swung to an inoperative position parallel to the side wall 3a when the device is not in use (see Fig. 5), and readily operated from the inoperative position to its operative position in engagement with the tarpaulin.

The clamping device 7b is releasably secured to the tubular member 12 by means, indicated as an entirety at 18, which effect an engagement of the arm 16 with the tarpaulin 6 under pressure. The securing means 18 comprise a pair of links 18a disposed upon opposite sides of the member 12 and pivoted thereto at their lower ends on diametrically disposed pivots 18b and a clamping element 19. The upper ends of the links 18a are connected by a cross bar 18c which is formed with a through screw threaded opening 18d for the screw threaded shank 19a of the clamping element 19 is mounted. The axis of the opening 18d is disposed parallel to the links 18a and when the latter are in operative position, as shown in Figs. 1 and 2, screwing of the element 19 inwardly against the adjacent end of the arm 16 exerts pressure downwardly endwise of the leg 17 and clamps the arm 16 to the tarpaulin 6. The pivots 18b are disposed adjacent the upper end of the tubular member 12, whereas the latter adjacent its lower end is provided at opposite sides thereof with stops 12a so that when the links 18a are swung to their inoperative position they engage the stops 12a as shown in Figs. 5 and 6. By supporting the links 18a at the upper end of the member 12, the clamping element 19 is out of engagement with the deck 2 when the links 18a are swung to their inoperative position. The wall of the tubular member 12 adjacent its upper end is offset whereby the opening adjacent its open end is of non-circular shape, in cross section, and the upper end of the leg 17 adjacent the arm 16 is of similar shape in cross section, so that when the clamping member 7b is raised out of engagement with the tarpaulin 6 and swung to its inoperative position and moved downwardly the non-circular surfaces on the leg 17 and inner wall of the member 12 interlock to maintain the clamping member 7b against swinging movement.

As shown, the arm 16 is formed intermediate its ends with a through opening 16a in which the wedge 15 is seated, as shown in Figs. 5 and 6, when the mechanism is not in use and as the clamping member 7a is pivotally mounted between the walls 10, 10a, all parts of the mechanism, when the latter is not in use, are maintained together and cannot be displaced or lost.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In mechanism of the class described, the combination of a supporting member adapted to be secured to the side wall of a hatch and provided with outwardly extending, spaced parallel walls the outer ends of which are inclined upwardly and outwardly and connected by an elongated transverse wall, a plate bridging the upper ends of said parallel walls and spaced from said transverse wall to form an opening leading into the space between said parallel walls, a clamping member disposed below said plate and between and movable relative to said parallel walls, said clamping member consisting of angularly related arms, the inner end of one arm being arranged to endwise engage a batten under pressure and clamp the latter against the marginal portion of a tarpaulin to secure the tarpaulin to the side wall of the hatch, the other arm extending downwardly and pivotally mounted at its lower end on a shaft the opposite ends of which are supported on said parallel walls, and a wedge extending through said opening and removably engaging said transverse wall and the outer end of said first mentioned arm to operate said clamping member about the shaft, whereby said first mentioned arm is forced into and held in engagement with the batten.

2. In the mechanism of the class described, the combination of a supporting member adapted to be secured to the side wall of a hatch and provided with outwardly extending, spaced parallel walls, the outer ends of which are connected by an elongated transverse wall, a plate bridging the upper ends of said parallel walls and spaced from said transverse wall to form an opening leading into the space between said parallel walls, a clamping member below said plate and between and movable relative to said parallel walls, said clamping member consisting of angularly related arms, one of said arms being movable substantially endwise and provided on its inner end with an enlarged head arranged to engage a batten under pressure and clamp the latter against the marginal portion of a tarpaulin to secure the tarpaulin to the side wall of the hatch, the other arm extending downwardly and pivotally mounted on a shaft supported at its opposite ends on said parallel walls, and a wedge extending through said opening and removably engaging said transverse wall and the outer end of said first mentioned arm to operate said clamping member about the shaft, whereby said first mentioned arm is forced into and held in engagement with the batten, that end of said plate remote from said opening serving as a stop arranged to be engaged by said head to limit the movement of said clamping member outwardly.

3. In mechanism of the class described, the combination of a supporting member adapted to be secured to the side wall of a hatch and provided with outwardly extending, spaced parallel walls, the outer ends of which are connected by an elongated transverse wall, a plate bridging the upper ends of said parallel walls and spaced from said transverse wall to form an opening leading into the space between said parallel walls, a batten adapted to engage and secure the marginal portion of a tarpaulin to the side wall of the hatch, the outer face of said batten being inclined downwardly and outwardly, a clamping member below said plate and between and movable relative to said parallel walls, said clamping member consisting of angularly related arms, one arm being provided on its inner end with an enlarged head the inner face of which is inclined upwardly and inwardly and arranged to interlockingly engage the inclined face of the batten under pressure to resist tension or pull of the tarpaulin on said batten, the other arm extending downwardly and pivotally mounted on a shaft supported at its opposite ends on said parallel walls, and a wedge extending through said opening and removably engaging said transverse wall and the outer end of said first mentioned arm to operate said clamping member about the shaft, whereby said first mentioned arm is forced into and held in engagement with the batten.

4. In mechanism of the class described, the combination of a supporting member adapted to be secured to the side wall of a hatch and provided with outwardly extending, spaced parallel walls, the outer ends of which are connected by an elongated transverse wall, a plate bridging the upper ends of said parallel walls and spaced from said transverse wall to form an opening leading into the space between said parallel walls, a shaft mounted at its opposite ends on and adjacent the lower ends of said parallel walls adjacent to said supporting member, a clamping member below said plate and between and movable relative to said parallel walls, said clamping member consisting of angularly related arms, the inner end of one arm being arranged to endwise engage a batten under pressure and clamp the latter against the marginal portion of a tarpaulin to secure the tarpaulin to the side wall of the hatch, the other arm extending downwardly and inwardly and pivotally mounted on said shaft, said shaft being mounted in a vertical plane disposed between the outer end of said plate and said supporting member, whereby, when said clamping member is swung to its inoperative position, the weight of the outer connected together ends of said arms serve to maintain said clamping member in such position, and a wedge extending through said opening and removably engaging said transverse wall and the outer end of said first mentioned arm to operate said clamping member about said shaft, whereby said first mentioned arm is forced into and held in engagement with the batten.

5. In mechanism of the class described, the combination of a supporting member adapted to be secured to the side wall of a hatch and provided with outwardly extending, spaced parallel walls the outer ends of which are inclined upwardly and outwardly and connected by an elongated transverse inclined wall, a clamping member disposed between and movable relative to said parallel walls, said clamping member consisting of angularly related arms, the inner end of one of said arms being arranged to endwise engage a batten under pressure and clamp the latter against the marginal portion of a tarpaulin to secure the tarpaulin to the side wall of the hatch, the other arm extending downwardly and pivotally mounted at its lower end on a shaft the opposite ends of which are supported on said parallel walls, and a wedge removably positioned between said parallel walls and engaging said transverse inclined wall and the outer end of said first mentioned arm to operate said clamping member about the shaft, whereby said first mentioned arm is forced into and held in engagement with the batten.

JOSEPH N. MATTHEWS.

References Cited in the file of this patent

UNITED STATES PATENTS

| Number | Name | Date |
|---|---|---|
| 1,094,400 | Burgess | Apr. 21, 1914 |
| 2,176,915 | Matthews | Oct. 24, 1939 |
| 2,261,557 | Matthews | Nov. 4, 1941 |
| 2,292,746 | Donald | Aug. 11, 1942 |